United States Patent
Chae et al.

(10) Patent No.: US 11,666,998 B2
(45) Date of Patent: Jun. 6, 2023

(54) RIGID INSERT SHAPE CONTROL IN LAYER JAMMMING SYSTEMS AND METHODS

(71) Applicant: GM GLOBAL TECHNOLOGY OPERATIONS LLC, Detroit, MI (US)

(72) Inventors: HyungMin Chae, Troy, MI (US); Tyson W. Brown, Royal Oak, MI (US); Richard J. Skurkis, Lake Orion, MI (US); Md Ashabul Anam, Sterling Heights, MI (US); Wonhee M. Kim, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 316 days.

(21) Appl. No.: 17/103,721

(22) Filed: Nov. 24, 2020

(65) Prior Publication Data
US 2022/0161378 A1    May 26, 2022

(51) Int. Cl.
*B23Q 3/08* (2006.01)
*B23Q 1/38* (2006.01)
*B25B 5/06* (2006.01)
*B25B 5/14* (2006.01)

(52) U.S. Cl.
CPC .............. *B23Q 3/088* (2013.01); *B23Q 1/38* (2013.01); *B25B 5/065* (2013.01); *B23Q 2703/04* (2013.01); *B25B 5/14* (2013.01)

(58) Field of Classification Search
CPC .......... B25B 5/065; B25B 5/14; B23Q 3/088; B23Q 1/38; B23Q 2703/04
USPC ................. 269/47, 48.1, 48.2, 48.3, 52, 22
See application file for complete search history.

(56) References Cited

U.S. PATENT DOCUMENTS

| 4,714,289 A * | 12/1987 | Arzenti | B23P 19/00 269/22 |
| 7,637,201 B2 | 12/2009 | Lin | |
| 8,087,845 B2 | 1/2012 | Lin et al. | |
| 8,548,626 B2 * | 10/2013 | Steltz | B25J 15/0023 294/213 |
| 8,702,340 B2 | 4/2014 | Lin et al. | |

(Continued)

OTHER PUBLICATIONS

U.S. Appl. No. 16/178,040, titled "Variable Friction Cargo Surface System for Vehicles," filed Nov. 1, 2018 by GM Global Technology Operations LLC.

(Continued)

*Primary Examiner* — Tyrone V Hall, Jr.
(74) *Attorney, Agent, or Firm* — Lorenz & Kopf LLP

(57) ABSTRACT

Systems and methods are provided for gripping of a workpiece with a layer jamming structure having rigid datum structures. A system includes a layer jamming structure configurable in an inactivated conformable state, with a membrane defining an internal cavity containing a number of overlapping material layers. The rigid structures engage the layer jamming structure. A pressure system includes a pump coupled with the internal cavity to change a pressure therein to transform the layer jamming structure from the inactivated conformable state to an activated rigid state disposed around the workpiece. The rigid structures help conform the layer jamming structure to the workpiece during transformation to the activated rigid state and to present datum fixturing surfaces in the activated rigid state.

20 Claims, 9 Drawing Sheets

(56) References Cited

U.S. PATENT DOCUMENTS

| | | | |
|---|---|---|---|
| 2010/0164187 A1* | 7/2010 | Geng | B23Q 3/06 |
| | | | 279/2.07 |
| 2015/0336227 A1 | 11/2015 | McKay et al. | |
| 2019/0106030 A1 | 4/2019 | Kim et al. | |
| 2019/0106916 A1 | 4/2019 | Sutherland et al. | |

OTHER PUBLICATIONS

U.S. Appl. No. 16/564,777, titled "Pneumatic Articulating Structure System with Internal Tile Architecture," filed Sep. 6, 2019 by GM Global Technology Operations LLC.

U.S. Appl. No. 16/654,292, titled "Selectively Rigidizable Membrane," filed Oct. 16, 2019 by GM Global Technology Operations LLC.

Jaiswal et al., Vacuum Cup Grippers for Material Handling in Industry, International Journal of Innovative Science, Engineering & Technology, Jun. 2017, pp. 187-194, vol. 4 Issue 6.

Kim et al., A Novel Layer Jamming Mechanism with Tunable Stiffness Capability for Minimally Invasive Surgery, IEEE Transactions on Robotics, Aug. 2013, pp. 1031-1042, vol. 29, No. 4.

\* cited by examiner

RIGID INSERT SHAPE CONTROL IN LAYER JAMMMING SYSTEMS AND METHODS

INTRODUCTION

The present disclosure generally relates to manufacturing tooling with shape control features, and more particularly relates to manufacturing systems and methods with conformable workpiece gripping where the device holding an object may include rigid features to control the gripping geometry and to present datums, where the device stiffens by layer jamming to constrain the workpiece.

Workpiece manipulation has generally been accomplished by manual activities which include an innate ability to control the adaptability to shapes and to control the force applied to objects. When mechanization takes the place of manual activities, the ability to control the adaptability to shape and to control the applied forces is subject to the inherent limitations imposed by the geometry and rigidity of mechanical structures. A mechanized gripper generally includes a pair of opposed, planar surfaces that compress an object for gripping, holding, lifting, and/or manipulation. However, the ability to control gripping may require more than just a compression function and therefore more sophisticated mechanisms are needed. For example, the shape of the objects being manipulated may be complex and may vary, requiring the ability to accommodate the complex shape and build variation that may exist. In addition, the increasing use of additive manufacturing processes has lead to the ability to create components which have increasingly complex shapes. These shapes may not include flat or other datum surfaces that are conveniently contacted for gripping. Therefore, a need for more adaptable gripping mechanisms is intensifying.

Accordingly, the ability of a gripper/manipulator to conform to an individual workpiece's geometry and to grasp complex shapes is desirable. Furthermore, other desirable features and characteristics of the present invention will become apparent from the subsequent detailed description and the appended claims, taken in conjunction with the accompanying drawings and the foregoing technical field and background.

SUMMARY

Systems and methods are provided with rigid features for improved shape control and datum locating features in layer jamming gripping of workpieces. In a number of embodiments, a system for holding a workpiece includes a layer jamming structure configurable in an inactivated conformable state. The layer jamming structure includes a membrane defining an internal cavity with a number of overlapping material layers contained in the internal cavity. A number of rigid structures engage the layer jamming structure. A pressure system includes a pump coupled with the internal cavity. The pressure system, with operation of the pump, changes a pressure in the internal cavity to transform the layer jamming structure from the inactivated conformable state to an activated rigid state disposed around the workpiece. The rigid structures help conform the layer jamming structure to the workpiece during transformation to the activated rigid state, and present datum fixturing surfaces in the activated rigid state.

In additional embodiments, the rigid structures comprise blocks fixed to the layer jamming structure.

In additional embodiments, a fixture is clamped onto at least two of the blocks to hold the workpiece.

In additional embodiments, a controller operates the pressure system and operates the fixture to clamp the blocks.

In additional embodiments, a sensor is coupled with the controller and monitors a parameter of the layer jamming structure.

In additional embodiments, a pressure chamber surrounds the workpiece. The controller is coupled with the pump and operates the pump to preconform, by the pressure chamber, the layer jamming structure to the workpiece prior to operating the pump to draw a vacuum in the internal cavity.

In additional embodiments, the sensor senses pressure in the pressure chamber. The controller operates the pump to vary the pressure in the pressure chamber in relation to a pressure in the internal cavity.

In additional embodiments, the workpiece includes a plurality of surfaces that are curved and/or oblique relative to each other, wherein the system is configured to grip the workpiece on the plurality of surfaces.

In additional embodiments, the layer jamming structure comprises a strip with ends. When in the activated rigid state, the layer jamming structure is clamped onto a section of the workpiece with the ends facing, and adjacent to, each other.

In additional embodiments, the rigid structures are fixed to the membrane.

In a number of additional embodiments, a method includes forming a layer jamming structure to include a membrane defining an internal cavity containing a number of overlapping material layers. A pressure system including a pump is coupled with the internal cavity. A number of rigid structures are positioned to engage the layer jamming structure to assist in shaping the layer jamming structure. The pressure system pump operates to change a pressure in the internal cavity to transform the layer jamming structure from an inactivated compliant state to an activated rigid state. With assistance from the rigid structures, the layer jamming structure is conformed to the workpiece during transformation to the activated rigid state. The rigid structures are used as datum fixturing surfaces when the layer jamming structure is in the activated rigid state.

In additional embodiments, the rigid structures comprise blocks fixed to the layer jamming structure.

In additional embodiments, a fixture clamps onto at least two of the blocks to hold the workpiece.

In additional embodiments, a controller operates the pressure system, and operates the fixture to clamp onto the blocks.

In additional embodiments, a sensor coupled with the controller monitors a parameter of the layer jamming structure.

In additional embodiments, the workpiece is surrounded by a pressure chamber. The controller is coupled with, and operates, the pump to pressurize the pressure chamber. The pressurization of the pressure chamber conforms the layer jamming structure to the workpiece prior to operating the pump to draw a vacuum in the internal cavity.

In additional embodiments, a sensor monitors pressure in the pressure chamber and the pump is operated to vary the pressure in the pressure chamber in relation to a pressure in the internal cavity.

In additional embodiments, the workpiece includes complex nonparallel surfaces. The workpiece is gripped on the complex nonparallel surfaces with the rigid structures presenting parallel surfaces for fixturing the workpiece.

In additional embodiments, the layer jamming structure is formed as a strip with ends. The layer jamming structure, in the activated rigid state, clamps onto a section of the workpiece with the ends facing, and adjacent to, each other.

In a number of other embodiments, a system for holding a workpiece includes a layer jamming structure configurable in an inactivated conformable state. The layer jamming structure includes a membrane defining an internal cavity and a number of overlapping material layers contained in the internal cavity. A number of rigid datum blocks engage the layer jamming structure. A pressure system including a pump is coupled with the internal cavity. The pressure system, with operation of the pump, is configured to change a pressure in the internal cavity to transform the layer jamming structure from the inactivated conformable state to an activated rigid state disposed around the workpiece. The rigid datum blocks are configured to conform the layer jamming structure to the workpiece during transformation to the activated rigid state and to present datum fixturing surfaces in the activated rigid state.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In various embodiments, a layer jamming structure may generally include an airtight envelope containing internal thin layers of sheet-like material. Air pressure is employed to activate the thin layers of material to amplify the friction between each layer. In embodiments, vacuum is used and the higher the vacuum pressure (negative pressure), the larger the friction between adjacent layers. The frictional changes may be used to vary the stiffness of the gripper, such as between a compliant state and a rigid state, and may be used to contain and grip an object, such as for holding, restraint and/or manipulation. In a number of embodiments, the layer jamming structure is combined with rigid features to aid in shape conforming and datum locating fixturing. In embodiments, pressure assist may be employed to further aid in shape conforming. The ability to shape the layer jamming structure with added rigid features and/or pressure assist expands the scope of workpiece shapes that may be held and enables more secure gripping.

Figure 1:
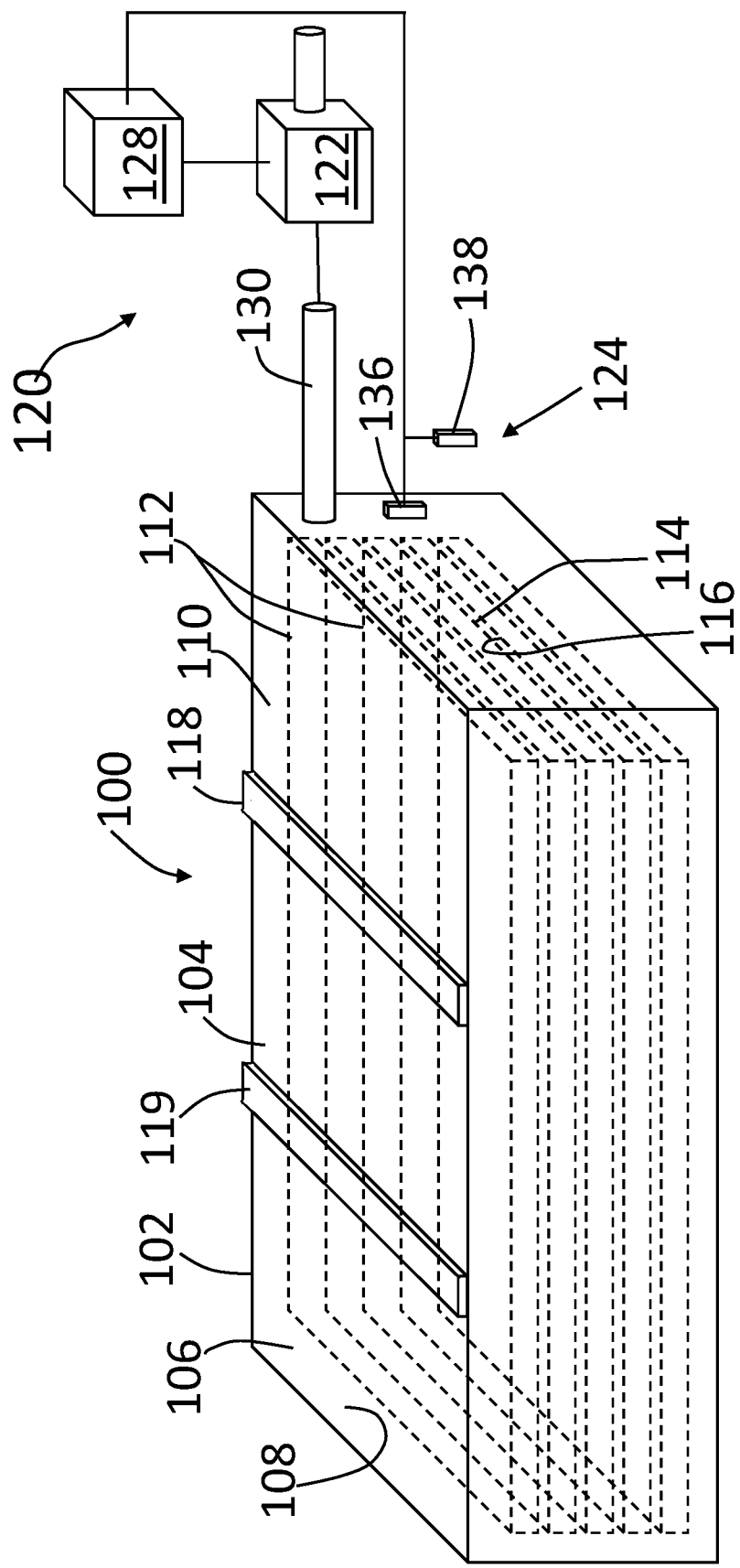
FIG. 1 is a schematic illustration of a layer jamming gripper with rigid features and associated pressure system in a compliant state, in accordance with various embodiments.

Referring to FIG. 1 a layer jamming structure 100, which may be configured as any of the layer jamming grippers described below, includes a membrane 102 that forms a wall 104 with an outer surface 106 and an inner surface 108 defining an enclosed internal cavity 110. The wall 104 may be made of one or multiple layers of a flexible material that, at least in some operational states, is compliant and deformable. In a number of embodiments, the material used for the wall 104 may include high friction properties at the outer surface 106 to facilitate gripping action relative to an object. For example, the membrane 102 may be constructed of an elastomer, such as natural or synthetic rubber. While the membrane 102 is depicted in a rectangular shape for simplicity, the membrane may be configured in any number of shapes, such as described below in cylindrical, band-like, strip-like configurations, or in other shapes adapted for gripping a given workpiece.

Figure 2:
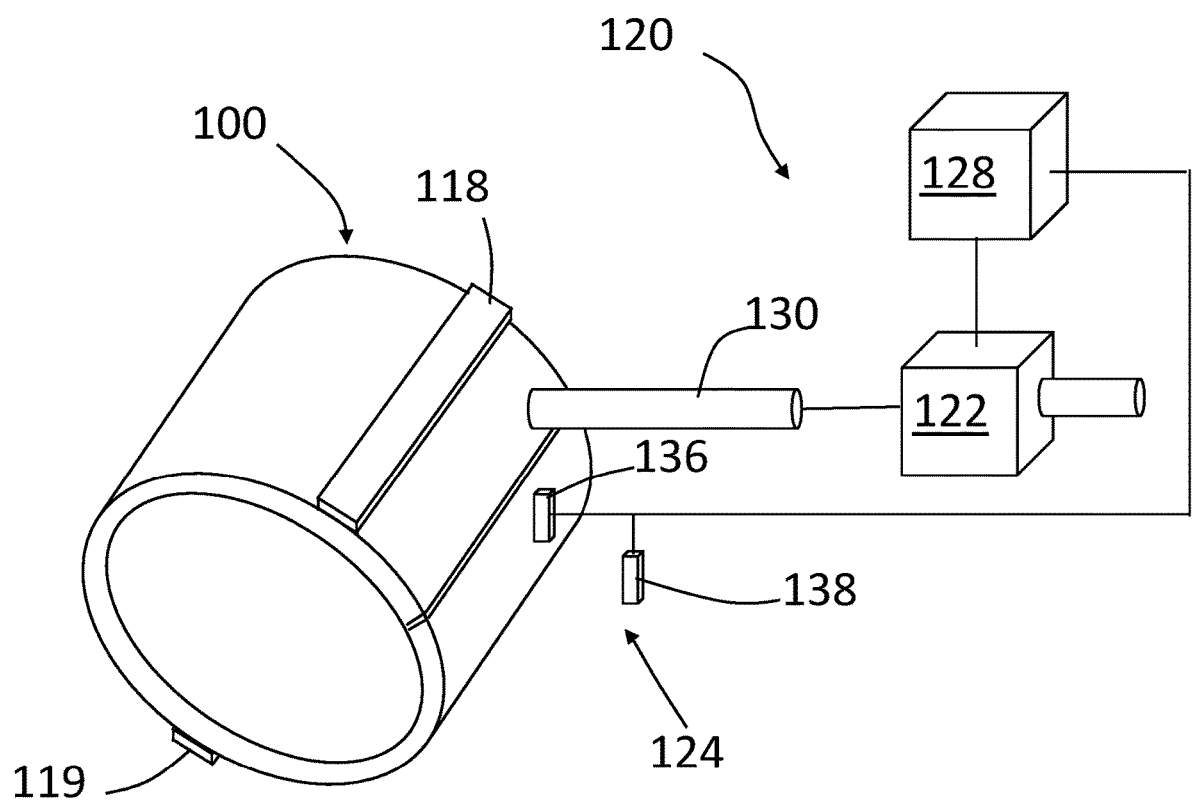
FIG. 2 is a schematic illustration of the layer jamming gripper and pressure system of FIG. 1 in an activated, shaped, and rigid state, in accordance with various embodiments.

A number of overlapping material layers 112 are enclosed within the internal cavity 110. The material layers 112 may be made of sheet-like material created from a synthetic (plastic), woven or otherwise formed natural fibers, an elastomer, or other materials. Alternate layers may comprise different materials or the same material. The material layers 112 are disposed within the internal cavity 110 with complementary facing surfaces (such as surfaces 114, 116), of adjacent material layers 112 disposed in close or direct contact to be brought together under the application of a force such as from an applied jamming pressure. As illustrated in FIG. 1, the material layers 112 are separate pieces aligned with one another. In other embodiments, the material layers 112 may be offset or staggered relative to one another. In additional embodiments, the material layers 112 may be part of a larger sheet of material that is folded into layers. As illustrated in FIG. 1, the pressure inside the internal cavity 110, including at the inner surface 108 is equal to the pressure (atmospheric pressure) outside the internal cavity 110, including at the outer surface 106. In this inactivated state, the material layers 112 are able to move relative to one another with the surfaces 114, 116 slidable past one another and the layer jamming structure 100 is compliant. As illustrated in FIG. 2, the pressure inside the internal cavity 110, including at the inner surface 108 is different from the pressure (atmospheric pressure) outside the internal cavity 110, including at the outer surface 106. In this activated state, the material layers 112 exhibit high friction relative to one another with the surfaces 114, 116 being urged to remain static relative to one another. As a result, the layer jamming structure 100 may be transitioned between a flexible compliant state of FIG. 1 and a rigid state of FIG. 2.

As illustrated in FIGS. 1 and 2, the layer jamming structure 100 has a number of rigid features 118, 119 that are fabricated from a permanently rigid material such as a metal, a composite, or a polymer. In a number of embodiments, the rigid features 118, 119 are made of steel. The rigid features 118, 119 comprise structures that act as bones, such as ribs, that impart a rigidity to the layer jamming structure 100 at select locations even when in the inactivated, flexible, compliant state. The rigid features 118, 119 are illustrated in a bar-like shape and extend across the outer surface 106 of the membrane 102 and are fixed thereto. In the illustrations of FIGS. 1 and 2 two rigid features 118, 119 are illustrated for simplicity, however, in a number of embodiments several rigid features 118, 119 are included, which may be disposed at locations where shape tailoring is desired to better conform to the workpiece being grasped and to present datums, as further described below.

In a number of embodiments, a method of controlling the applied jamming force of the layer jamming structure 100 includes operation of a pressure system 120. In general, the pressure system 120 includes a pump 122, a sensor suite 124, and a controller 128 coupled with each of the pump 122 and the sensor suite 124. The internal cavity 110 is in fluid communication with the pump 122 through a conduit 130 that extends through an opening in the wall 104 of the membrane 102. A fluid such as air may be introduced into, or removed from, the internal cavity 110 through the conduit 130 to increase or decrease pressure in the internal cavity 110. The pump 122 is connected in the conduit 130 to facilitate air movement therethrough. In a number of embodiments, a valved conduit (not shown), may be in fluid communication with the internal cavity. Such a valve may be opened, for example to efficiently relieve vacuum in the internal cavity 110 without operation of the pump 122 and may be closed, such as when a vacuum is drawn by the pump 122. The controller 128 controls operation of the pump 122 and the valve when included, in coordination.

The controller 128 is supplied with parameter data from the sensor suite 124. The sensor suite 124 may include sensor(s) 136 contained in the internal cavity 110, or extending through or embedded in the membrane 102. The sensor suite 124 may include sensors 138 external to the membrane 102. The sensor suite 124 may be configured to monitor at least one parameter such as to determine air pressure, force, position/location, and/or other system parameters. The sensor suite 124 is coupled with the controller 128, which receives signals from the sensor suite 124 for making determinations related to the capture, gripping and manipulation of objects. In general, the controller 128 uses the available inputs, including those from the sensor suite 124, to provide a control system of the pressure system 120 and other systems to effectively govern various functions of the fixturing of an object such as a workpiece. The controller 128 generally includes a processor and a memory device, and may be coupled with a storage device. The processor performs the computation and control functions of the controller 128 according to programmed steps, algorithms, calculations, etc., and may comprise any type of processor or multiple processors. The controller 128 may be coupled with one or more actuator(s) to effect various actions as described below.

To make the layer jamming structure 100 rigid, such as to effect gripping, air or another fluid may be evacuated from the internal cavity 110 creating a vacuum pressure condition within the internal cavity 110. The membrane 102 and the material layers 112 transition between a compliant state to a rigid state, by establishing a pressure differential across the wall 104 of the membrane 102 at the inner surface 108 and the outer surface 106. In FIG. 1, the pressure inside the membrane 102 in the internal cavity 110 is generally equal to the pressure outside of the membrane 102, and the layer jamming structure 100 is in a compliant state. For example, the pressure inside the membrane 102 may be the same, or approximately the same, as the pressure outside the membrane 102. In this compliant state, the overlapping material layers 112 readily move relative to one another (for example, by sliding or shearing past each other) and are relatively easily deformable in response to an applied force or load. This compliant state allows the layer jamming structure 100 to be formed into various shapes in response to applied forces.

As illustrated in FIG. 2, pressure in the internal cavity 110 is different, and in this case less than the pressure outside of the membrane 102. This difference in pressure causes the membrane 102 to contract and causes the frictional resistance between the material layers 112 to increase as the overlapping material layers 112 are compressed together, creating a rigid state. In the current embodiment, the pressure inside the membrane 102 is significantly lower (such as by a factor of ten or more), than the pressure outside the membrane 102. The extent of rigidity is a factor of the extent to which adjacent material layers overlap, material layer 112 frictional properties, and the pressure difference between the internal cavity 110 and the environment outside the membrane 102. A high level of rigidity may be achieved, which locks the layer jamming structure 100 in a rigid state. The activated layer jamming structure 100 is reconfigured to a cylindrical tube shape. The transformation in shape may be assisted by forces generated by the rigid features 118, 119, by forces generated due to the construction/arrangement of the material layers 112, by forces generated by the construction of the membrane 102, and/or by externally applied forces. In this embodiment, the rigid features 118, 119 are disposed on opposite sides of the cylindrical shape and provide flat and secure parallel datums that may be used for locating the layer jamming structure 100 and a captured workpiece, in a fixture. In addition, the rigid features 118, 119 provide secure mating datum features for fixturing a workpiece.

Figure 3:
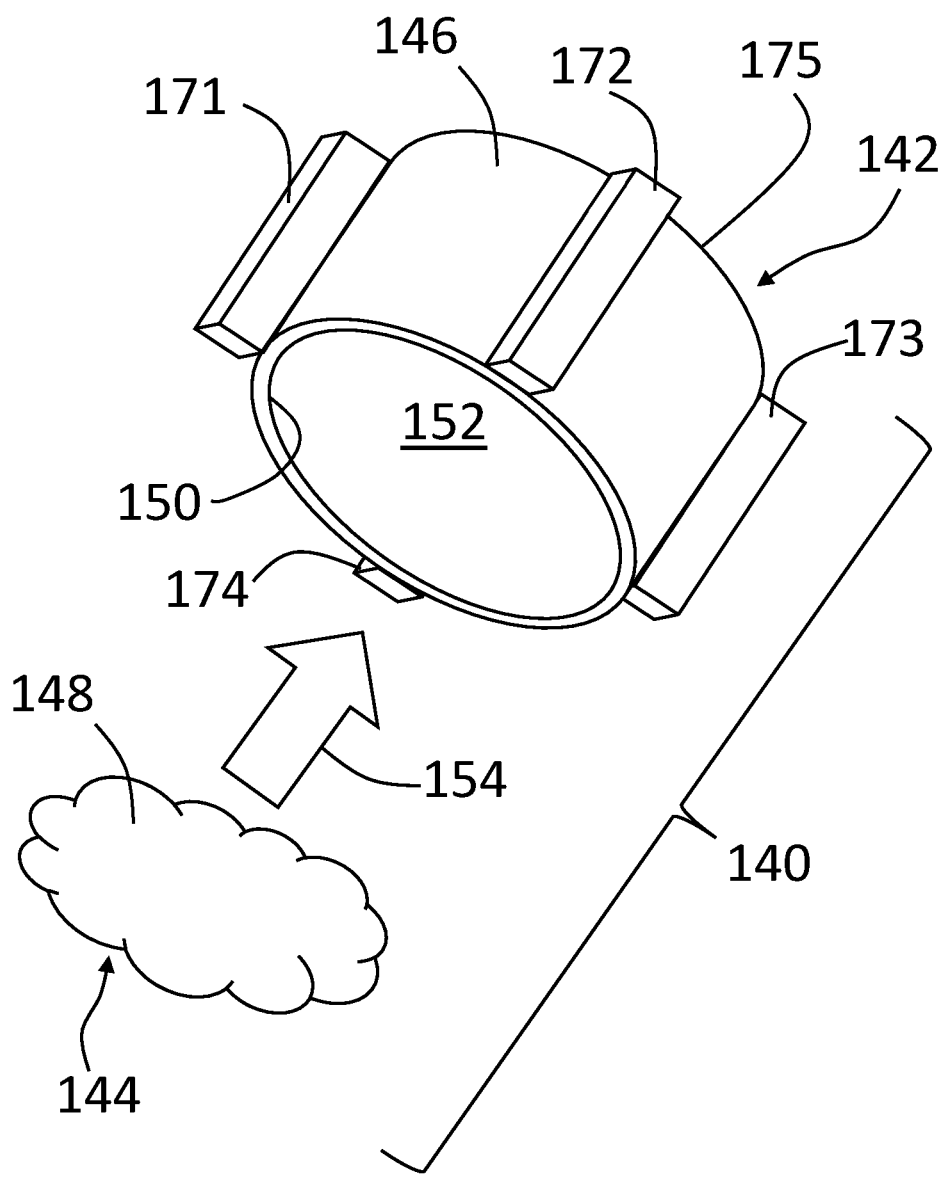
FIG. 3 is a schematic illustration of a system with a layer jamming gripper having rigid features for shape control, in the process of receiving a workpiece, in accordance with various embodiments.
Figure 4:
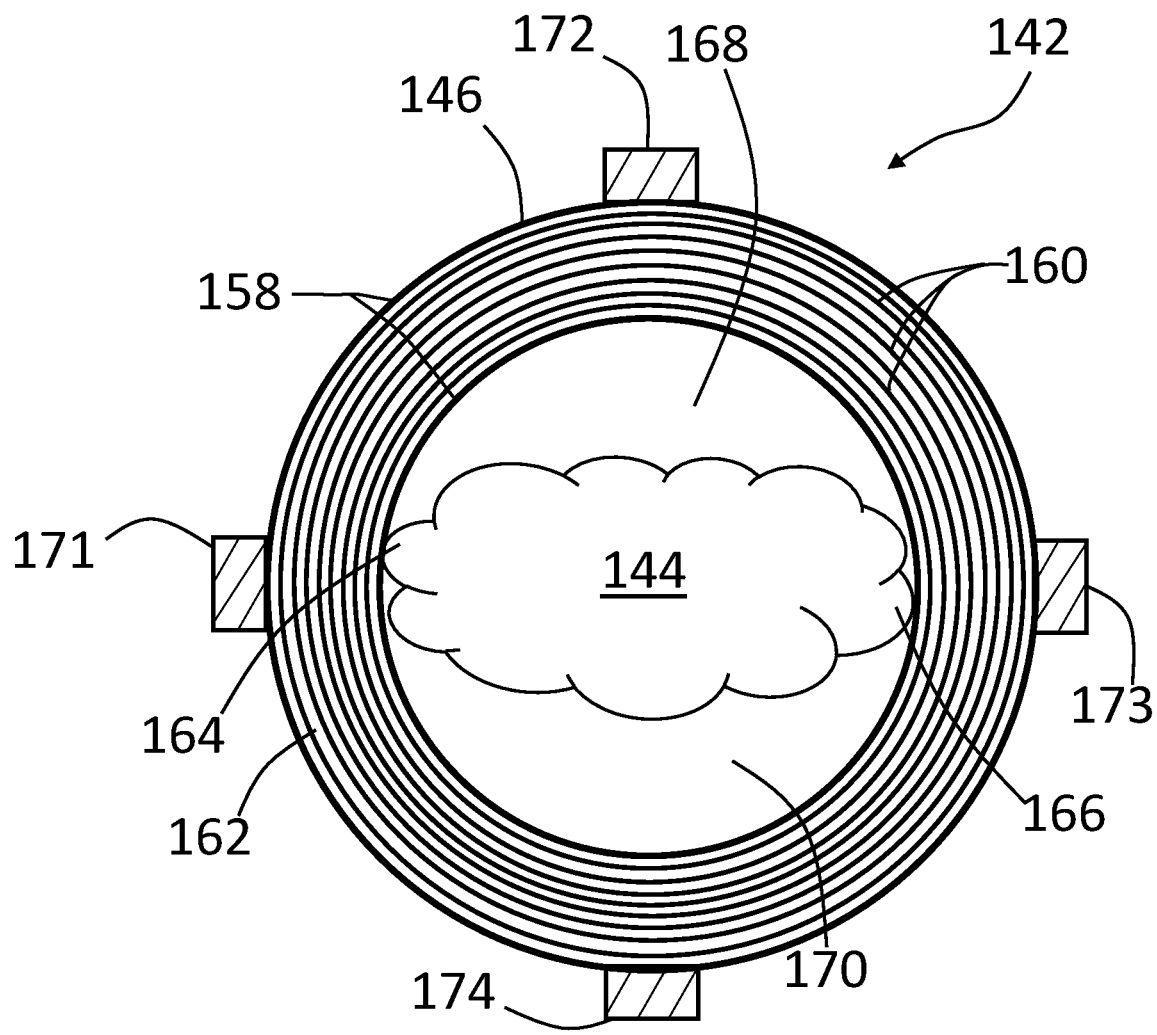
FIG. 4 is a schematic, sectional illustration of a layer jamming gripper with rigid features for shape control in a compliant state and enveloping a workpiece, in accordance with various embodiments.

Referring to FIG. 3, a gripping system 140 is illustrated with a gripper 142 configured in a preformed and closed perimeter cylindrical-like shape to receive a 3-dimensional object in the form of a workpiece 144. The gripping system 140 is configured for an application involving use of a layer jamming structure 146 as part of the gripper 142 to grasp and hold the workpiece 144. The workpiece 144 exhibits an irregular, complex shape 148 defining surfaces with no parallel opposite sides to clamp onto. In various embodiments, the workpiece 144 may have no flat surfaces or features for conventional gripping technologies to engage. The layer jamming structure 146 has an open end 150 through which the workpiece 144 may be received into the interior space 152 of the gripper 142, as indicated by the arrow 154. Following insertion, the workpiece 144 is, at least partially, enveloped by the gripper 142 as shown in FIG. 4, to which reference is also directed. FIG. 4 depicts the layer jamming construction of the gripper 142 with a membrane 158 encapsulating a number of material layers 160 in an internal cavity 162. As shown in FIG. 4, the gripper 142, and in particular the layer jamming structure 146 (in an inactivated compliant state), is in receipt of the workpiece 144. The gripper 142 is configured so that two opposed sides 164, 166 of the workpiece 144 engage the membrane 158 for initial support, while other areas of the workpiece 144 are spaced away from the membrane 158 such as with gaps 168, 170. In this state, the workpiece 144 is readily received in the gripper 142, and is at least partially constrained therein.

The gripping system 140 includes a number of rigid features designated as blocks 171-174. The blocks 171-174 are depicted as elongated rib-like elements but may be constructed in a number of other shapes. In this embodiment, the blocks 171-174 extend across the layer jamming structure 146 and are disposed parallel to the cylindrical shape's height. The blocks 171-174 extend from the open end 150 to the end 175, which may also be open so that the layer jamming structure 146 is configured as a tube-like structure. While four blocks 171-174 are illustrated, a large number may be included, and in some embodiments, the blocks may be distributed around the perimeter of the cylindrical shape, located next to one another, and may completely encircle the gripper 142. The blocks 171-174 may be fixed to, or encapsulated in the membrane 158. Fixing may be accomplished by an adhesive, by a mechanical connection, or otherwise.

Figure 5:
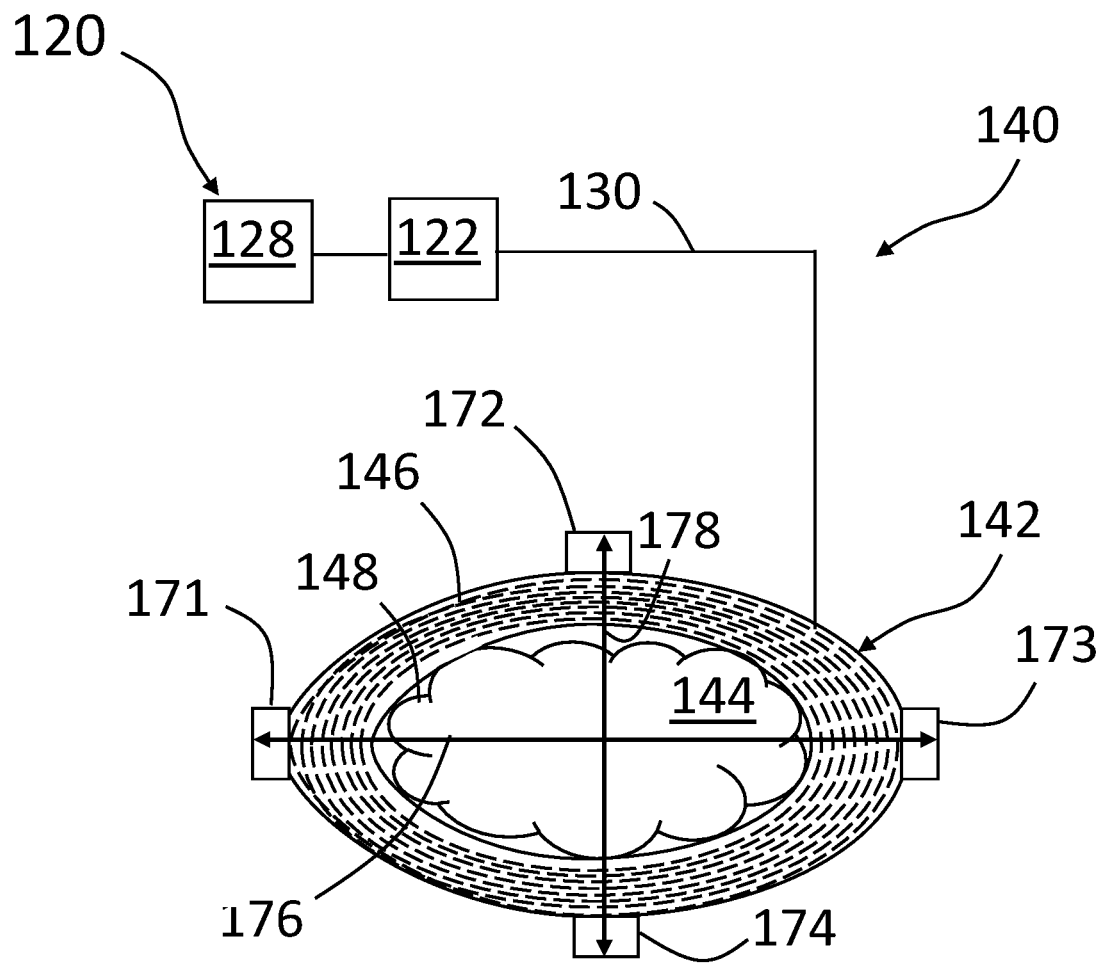
FIG. 5 is a schematic illustration of the pressure system of FIG. 1 on the layer jamming gripper of FIG. 3 in a rigid state and holding the workpiece of FIG. 3, in accordance with various embodiments.

As illustrated in FIG. 5, a gripping system 140 includes the layer jamming structure 146 of the gripper 142 coupled with the pressure system 120. The layer jamming structure 146 is sized and disposed to receive, and at least partially envelop, the workpiece 144. The pressure system 120 has been operated, such as by the controller 128 running the pump 122, and the internal cavity 162 has been evacuated, conforming the membrane 158 to the workpiece 144. In this activated state, the gaps 168, 170 are substantially eliminated. As vacuum is drawn within the internal cavity 162, the material layers 160 are locked in place conforming, and making rigid, the layer jamming structure 146. A predetermined pressure differential may be applied to lock the layer jamming structure 146 in state. In other embodiments, the sensor suite 124 may include pressure sensing and/or object vision and the controller 128 may adapt the applied pressure differential, and resulting clamping force, based on variations in the size, shape and/or orientation of the workpiece 144.

It should be understood that the initially compliant layer jamming structure 146, if the blocks 171-174 were not included, may conform to the workpiece 144 resulting in the presentation of an outer surface that would be irregular and create fixturing challenges where only point contacts would be possible. With the blocks 171-174 included, the maximum x and y coordinate dimensions (176, 178, respectively), of the grasped workpiece package are defined for fixturing. The blocks 171-174 present datums for locating the package in a fixture and present solid surfaces for contacting and securely holding the workpiece 144. In addition, the blocks 171-174 help shape the layer jamming structure 146 to conform to the workpiece during activation. For example, the irregular shape is closely engaged by the layer jamming structure 146. Because the surfaces of the shape 148 are closely enveloped and engaged by the layer jamming structure 146, the workpiece 144 is securely grasped and held. In a number of embodiments, the workpiece 144 may be an additive manufactured object and may be fixtured for post-printing operations, such as to remove supports needed for printing, or other operations. Securing the workpiece 144 by the gripper 142 ensures secure and orientable fixturing for the post-printing operations.

Figure 6:
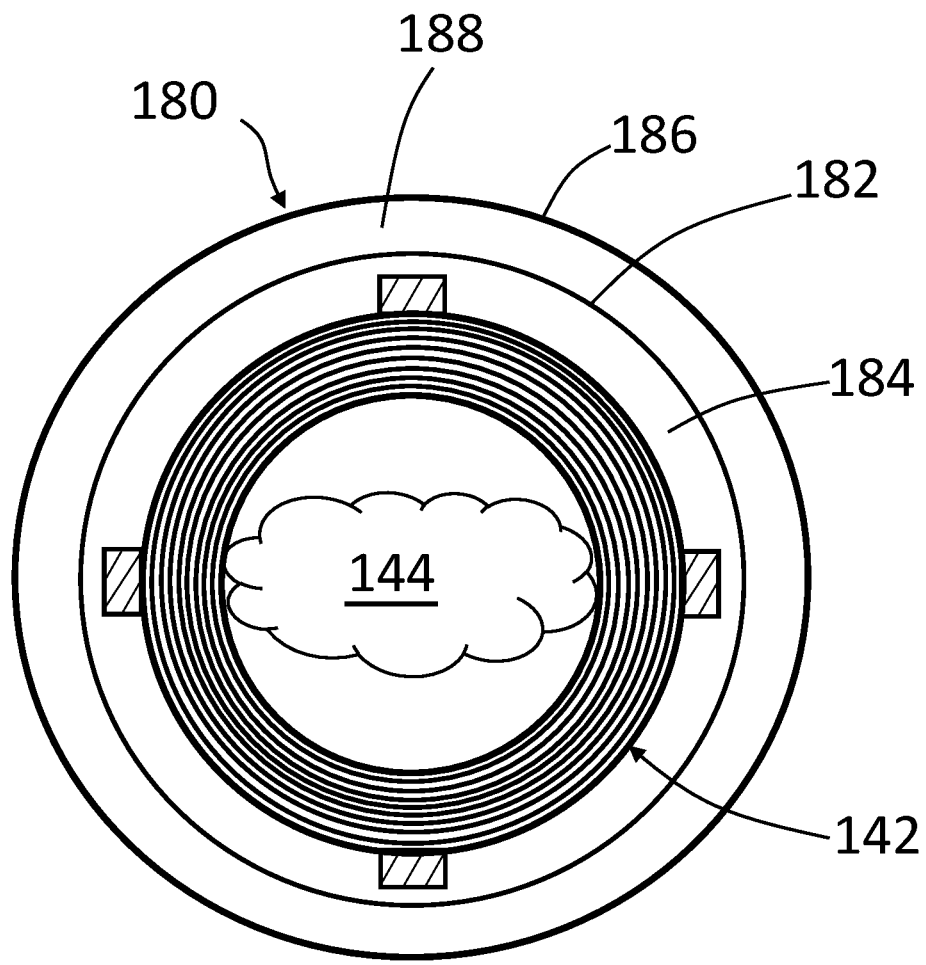
FIG. 6 is schematic, sectional illustration of the workpiece and gripper of FIG. 4 in a compliant state and disposed in a pressure chamber, in accordance with various embodiments.

Referring to FIG. 6, the gripper 142, in a compliant state with the workpiece 144 enveloped, is disposed in a pressure chamber 180. The pressure chamber 180 may be spherical or may otherwise extend around and encapsulate the package of the gripper 142 and workpiece 144. The pressure chamber 180 includes a compliant bladder 182 that surrounds the gripper 142 in an enclosed space 184. The bladder 182 may be of a clamshell, zippered, or otherwise openable and resealable construction for insertion of the gripper 142 into the enclosed space 184. With the gripper 142 and contained workpiece 144 sealed in the bladder 182, the assembly is placed within a rigid reaction shell 186. The reaction shell 186 may also be of a clamshell, zippered, or otherwise openable and resealable construction for insertion of the bladder 182 with the gripper 142 and the workpiece 144 inside. With the reaction shell 186 closed and sealed, a pressure space 188 is defined between the bladder 182 and the reaction shell 186.

Figure 7:
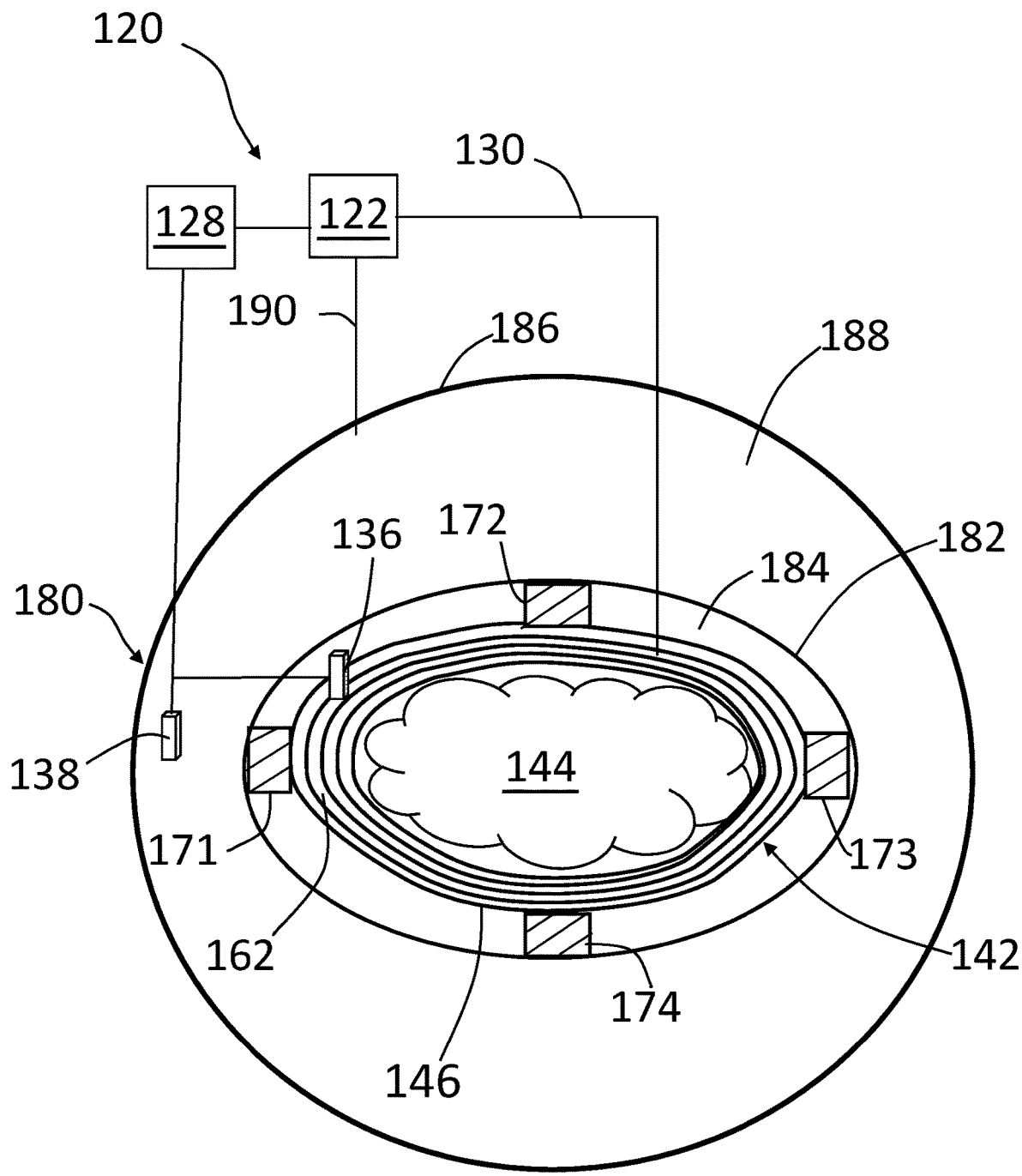
FIG. 7 is schematic, sectional illustration of the pressure system of FIG. 1 on the layer jamming gripper of FIG. 3 with pressure shape control for enveloping the workpiece, in accordance with various embodiments.

As illustrated in FIG. 7, the pressure system 120 is connected with the internal cavity 162 of the layer jamming structure 146 through the conduit 130. The pressure system 120 is also connected with the pressure space 188 through a conduit 190. In operation, the pump 122, as operated by the controller 128 changes the pressure inside the pressure space 188 and also inside the internal cavity 162. To assist in conforming the layer jamming structure 146 to the workpiece 144, the pressure is increased in the pressure space 188 to direct/force the boundary of the layer jamming structure 146 toward the workpiece 144. The blocks 171-173 are provided with a shape that may also assist in conforming the layer jamming structure 146 to the workpiece 144. To transform the layer jamming structure 146 from a compliant state to a rigid state, the pressure in the internal cavity 162 is decreased. In an embodiment, initiating a pressure increase in the pressure space 188 is performed before a vacuum is drawn in the internal cavity 162, resulting in improved shape conformity and to help align the blocks 171-173. In other embodiments, the pressure changes are initiated simultaneously. In additional embodiments, a vacuum is initiated in the internal cavity 162 before initiating a pressure increase in the pressure space 188. When the layer jamming structure 146 is conformed and locked in state, the gripper 142 with the contained workpiece 144 is removed from the pressure chamber 180. The conduit 130 may remain coupled with the internal cavity 162 to maintain the vacuum, or a valve may be provided and closed to maintain the vacuum in the internal cavity 162 when the conduit is disconnected, so that the layer jamming structure 146 remains rigid and locked.

Figure 8:
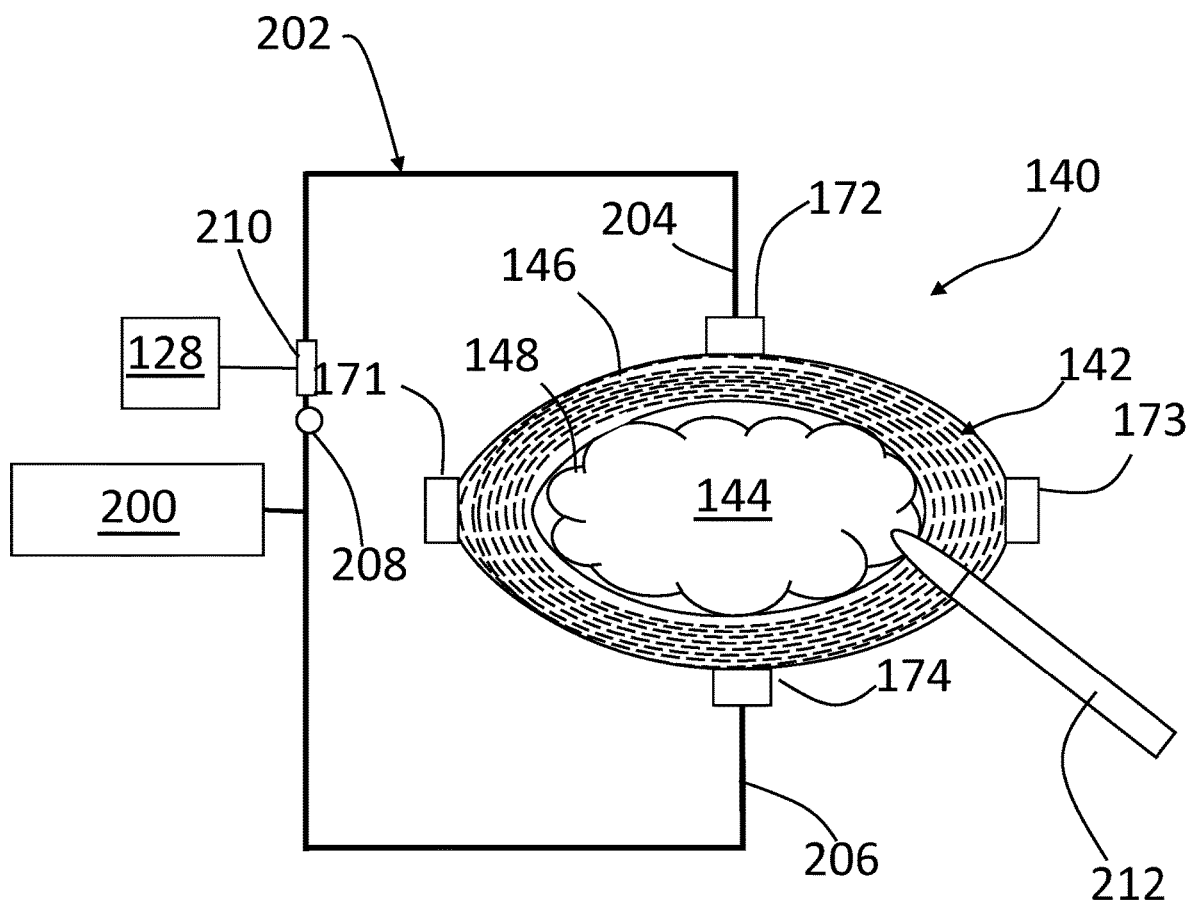
FIG. 8 is schematic illustration of the workpiece held by the layer jamming gripper of FIG. 4 and of FIG. 5 mounted in a fixture, in accordance with various embodiments.

Whether the gripper 142 holds the workpiece 144 as a result of the approach described in relation to FIG. 7, or as a result of the approach described in relation to FIG. 5, the gripping system 140 presents the blocks 171-174 facilitating fixturing. As shown in FIG. 8, the gripping system 140 is mounted in a fixture 200 and is securely held, such as for processing of the workpiece 144. The fixture 200 includes a clamp 202 with a pair of arms 204, 206 that pivot relative to one another on a hinge 208 to open and close for grasping and releasing the gripping system 140. The arms 204, 206 are configured to locate on, and grasp, at least two of the blocks 171-174, in this case blocks 172 and 174. An actuator 210, operated by the controller 128, moves the arms 204, 206 in response to programmed specifications. The gripper 142 is configured so that the part of the workpiece 144 requiring machining is exposed. A tool 212, which may operate in a manufacturing process of addition or subtraction, and which may be operated by the controller 128, is able to reach the workpiece 144 to carry out its intended operation. When processing the workpiece is complete, The actuator 210 is operated to release force from the blocks 172, 174, and the gripping system 140 is released. The vacuum is relieved in the internal cavity 162 unlocking the layer jamming structure 146, and the workpiece 144 is removed from the gripper 142, which may be reused.

Figure 9:
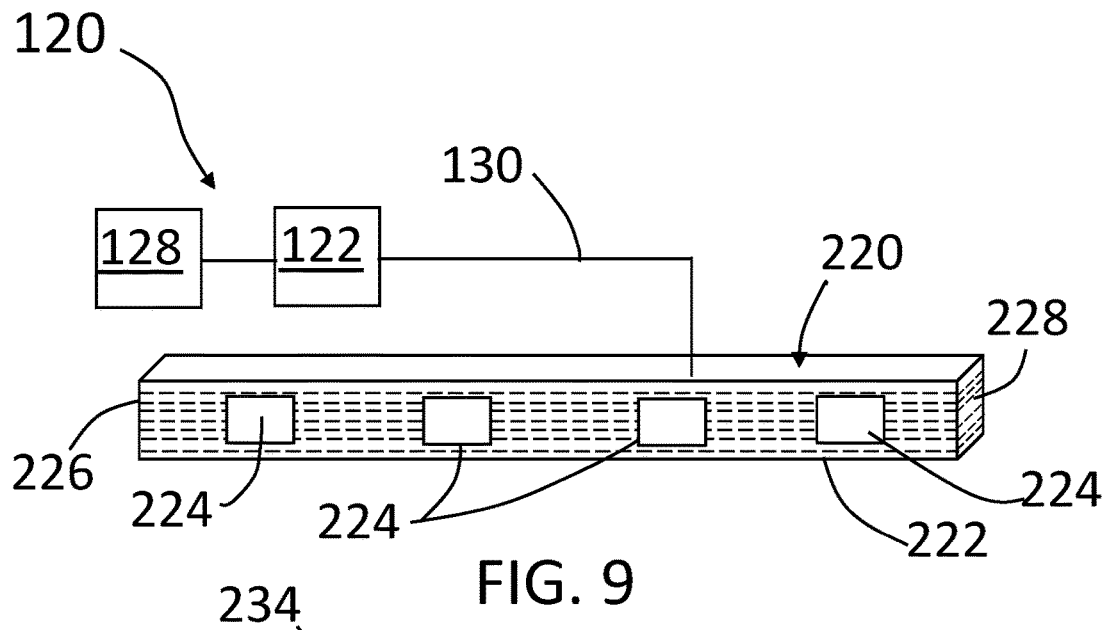
FIG. 9 is a schematic illustration of a linear layer jamming gripper with rigid features, shown in an inactivated, compliant state, in accordance with various embodiments.
Figure 10:
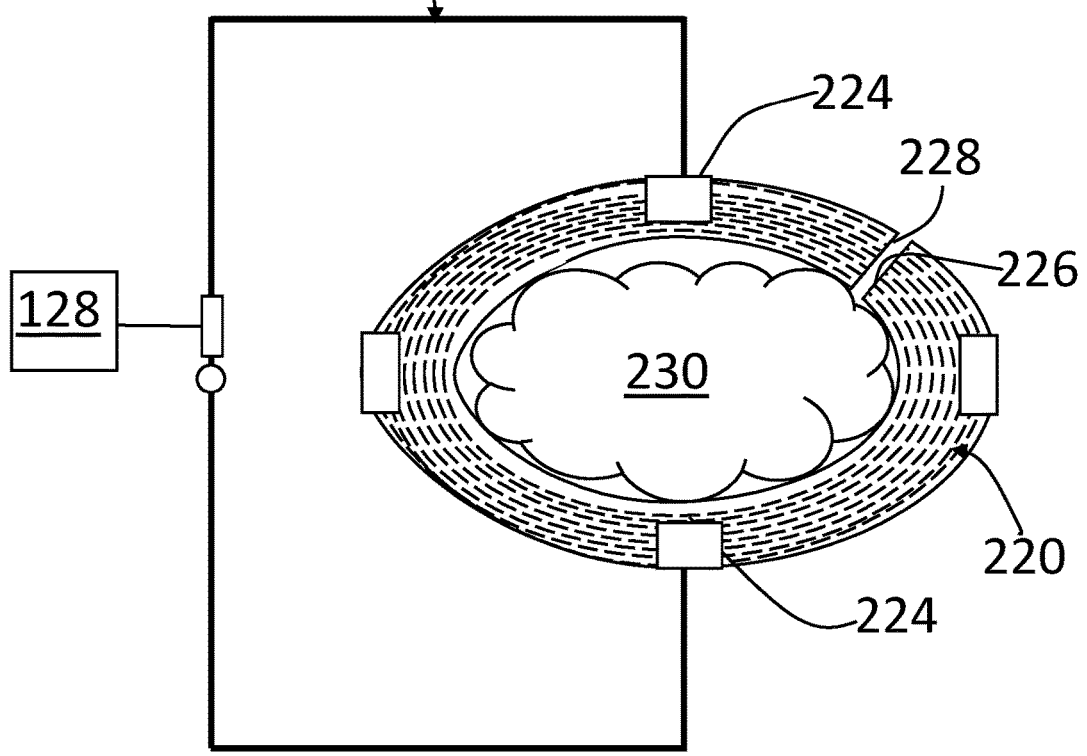
FIG. 10 is a schematic illustration of the linear layer jamming gripper of FIG. 7, shown in an activated, rigid state and gripping a workpiece and mounted in a fixture, in accordance with various embodiments.

Referring to FIG. 9, a gripper 220 is configured in a strip or band shape and includes a layer jamming structure 222 with imbedded rigid inserts designated as blocks 224. In FIG. 9, the gripper 220 is in an inactivated conformable state. The strip shape facilitates gripping a workpiece 230 as a band-like clamp as shown in FIG. 10, where the layer jamming structure 222 is in an activated, rigid state. The gripper 220 partially to fully wraps around a given object (workpiece 230), with the ends 226, 228 disposed adjacent to and facing one another. The gripper 220 is stiffened by generating a vacuum in the layer jamming structure 222, such as by operation of the pressure system 120 using the pump 122 and the controller 128. The gripper 220 is configured so that at least two of block 224 inserts are disposed parallel each other in the rigid state to define datums for fixturing the workpiece 230 in a fixture 234, as shown in FIG. 10. The datums are used in machining and/or assembly operations carried out with the workpiece 230. The approaches described in relation to FIG. 7 may be used with the gripper 220 to initiate and/or assist in shape conforming.

Through the embodiments disclosed herein, gripping systems and methods provide secure gripping and holding of workpieces that have complex/irregular shapes. Rigid features help conform the layer jamming structure to the workpiece as it is locked in a rigid state by creation of a vacuum. For example, rigid block inserts facilitate ease of wrapping the layer jamming structure clamp around a given 3-dimensional object in flexible state. The rigid features not only help conform the layer jamming structure, they provide locating datums and present rigid structures with surfaces for accurate and secure fixturing. For example, two or more rigid inserts become parallel planes of the object, and these define the datum of the object. The datums may be used in machinating/assembly fixturing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements and/or steps without departing from the scope of the disclosure as set forth in the appended claims and the legal equivalents thereof.

What is claimed is:

1. A system for holding a workpiece, the system comprising:
    a layer jamming structure configurable in an inactivated conformable state, the layer jamming structure including:
        a membrane defining an internal cavity; and
        a number of overlapping material layers contained in the internal cavity;
    a number of rigid structures engaging the layer jamming structure at the membrane; and
    a pressure system including a pump coupled with the internal cavity,
    wherein the pressure system, with operation of the pump, is configured to change a pressure in the internal cavity to transform, by locking of the overlapping material layers, the layer jamming structure from the inactivated conformable state to an activated rigid state disposed around the workpiece,
    wherein the number of rigid structures are configured, to:
        assist the layer jamming structure to conform to the workpiece during a transformation to the activated rigid state; and
        present datum fixturing surfaces in the activated rigid state for locating, after the transformation, the layer jamming structure and the workpiece in a fixture, to present the datum fixturing surfaces for contact by the fixture to securely hold the workpiece.

2. The system of claim 1, wherein the rigid structures are configured to move with the membrane during the transformation to the activated state.

3. The system of claim 1, wherein the number of rigid structures comprise blocks fixed to the layer jamming structure, wherein a fixture is clamped onto at least two of the blocks to hold the workpiece.

4. The system of claim 3, comprising a controller configured to operate the pressure system and configured to operate the fixture to clamp the blocks.

5. The system of claim 4, comprising at least one sensor coupled with the controller, the at least one sensor configured to monitor a parameter of the layer jamming structure.

6. The system of claim 1, comprising a pressure chamber surrounding the workpiece, and comprising a controller coupled with the pump, wherein the controller is configured to operate the pump to preconform, by the pressure chamber, the layer jamming structure to the workpiece prior to operating the pump to draw a vacuum in the internal cavity.

7. The system of claim 6, comprising a sensor configured to sense a first pressure in the pressure chamber, wherein the controller is configured to operate the pump to vary the first pressure in the pressure chamber in relation to a second pressure in the internal cavity.

8. The system of claim 1, wherein the workpiece includes a plurality of surfaces that are at least one of curved and oblique relative to each other, wherein the system is configured to grip the workpiece on the plurality of surfaces.

9. The system of claim 1, wherein the layer jamming structure comprises a strip with ends, wherein when in the activated rigid state, the layer jamming structure is clamped onto a section of the workpiece with the ends facing, and adjacent to, each other.

10. The system of claim 9, wherein the rigid structures are fixed to the membrane.

11. A method for holding a workpiece, the method comprising:
    forming a layer jamming structure including a membrane defining an internal cavity containing a number of overlapping material layers;
    coupling a pressure system including a pump with the internal cavity;
    positioning a number of rigid structures to engage the layer jamming structure to assist in shaping the layer jamming structure;
    positioning the workpiece in the layer jamming structure;
    surrounding the workpiece by a pressure chamber;
    coupling a controller with the pump;
    operating, by the controller, the pump to pressurize the pressure chamber;

preconforming, by the pressurization of the pressure chamber, the layer jamming structure to the workpiece prior to operating the pump to draw a vacuum in the internal cavity;

operating, by the pressure system, the pump to change a pressure in the internal cavity to transform the layer jamming structure from an inactivated compliant state to an activated rigid state;

conforming, with assistance from the number of rigid structures, the layer jamming structure to the workpiece during transformation to the activated rigid state; and using the number of rigid structures as datum fixturing surfaces when the layer jamming structure is in the activated rigid state.

12. The method of claim 11, comprising fixing the number of rigid structures to the layer jamming structure, wherein the number of rigid structures comprise blocks.

13. The method of claim 12, comprising clamping, by a fixture, onto at least two of the blocks to hold the workpiece.

14. The method of claim 12, comprising:
operating, by a controller, the pressure system; and
operating, by the controller, a fixture to clamp onto the blocks.

15. The method of claim 14, comprising monitoring, by at least one sensor coupled with the controller, a parameter of the layer jamming structure.

16. The method of claim 11, comprising moving the rigid structures with the membrane under operation of the pressure.

17. The method of claim 11, comprising:
sensing a pressure in the pressure chamber; and
operating the pump to vary the pressure in the pressure chamber in relation to a pressure in the internal cavity.

18. The method of claim 11, wherein the workpiece includes complex nonparallel surfaces, and comprising:
gripping the workpiece on the complex nonparallel surfaces; and
presenting, by the rigid structures, parallel surfaces for fixturing the workpiece.

19. The method of claim 11, comprising:
forming the layer jamming structure as a strip with ends; and
clamping, by the layer jamming structure in the activated rigid state, onto a section of the workpiece with the ends facing, and adjacent to, each other.

20. A system for holding a workpiece, the system comprising:
a layer jamming structure configurable in an inactivated conformable state, the layer jamming structure including:
a membrane defining an internal cavity; and
a number of overlapping material layers contained in the internal cavity;
a number of rigid datum blocks engaging the layer jamming structure at the membrane and fixed to the membrane; and
a pressure system including a pump coupled with the internal cavity,
wherein the pressure system, with operation of the pump, is configured to change a pressure in the internal cavity to transform, by locking of the overlapping material layers, the layer jamming structure from the inactivated conformable state to an activated rigid state disposed around the workpiece,
wherein the number of rigid datum blocks are configured, to:
assist the layer jamming structure to conform to the workpiece during a transformation to the activated rigid state; and
present datum fixturing surfaces in the activated rigid state for locating, after the transformation, the layer jamming structure and the workpiece in a fixture, to present the datum fixturing surfaces for contact by the fixture to securely hold the workpiece.

* * * * *